United States Patent
Neary et al.

(10) Patent No.: US 12,458,372 B2
(45) Date of Patent: Nov. 4, 2025

(54) TOOL FOR TISSUE DISSECTION, FLUID SUCTION, AND SMOKE EVACUATION

(71) Applicant: 5TH INTERVAL, LLC, Huntington Beach, CA (US)

(72) Inventors: Douglas W. Neary, Santa Ana, CA (US); Thomas G. Fogarty, La Quinta, CA (US)

(73) Assignee: 5TH INTERVAL, LLC, Huntington Beach, CA (US)

( * ) Notice: Subject to any disclaimer, the term of this patent is extended or adjusted under 35 U.S.C. 154(b) by 64 days.

(21) Appl. No.: 18/598,533

(22) Filed: Mar. 7, 2024

(65) Prior Publication Data

US 2024/0299045 A1    Sep. 12, 2024

Related U.S. Application Data

(60) Provisional application No. 63/450,501, filed on Mar. 7, 2023.

(51) Int. Cl.
*A61B 17/16* (2006.01)
*A61B 17/68* (2006.01)
*A61B 17/00* (2006.01)

(52) U.S. Cl.
CPC ........... *A61B 17/1671* (2013.01); *A61B 2017/00469* (2013.01); *A61B 2017/00477* (2013.01); *A61B 2217/005* (2013.01); *A61B 2217/007* (2013.01)

(58) Field of Classification Search
CPC .................................................. A61B 17/1671
See application file for complete search history.

(56) References Cited

U.S. PATENT DOCUMENTS

| | | | |
|---|---|---|---|
| D718,856 S * | 12/2014 | Altschuler | D24/140 |
| 8,992,524 B1 * | 3/2015 | Ellman | A61B 18/14 606/49 |
| 9,101,371 B2 * | 8/2015 | Assell | A61B 17/1664 |
| 9,468,432 B2 * | 10/2016 | Zavatsky | A61B 17/0218 |
| 9,907,546 B2 * | 3/2018 | Eckermann | A61B 17/02 |
| 11,413,051 B2 * | 8/2022 | Cushen | A61B 17/32002 |
| 2009/0209827 A1 * | 8/2009 | Shelokov | A61B 17/02 600/205 |
| 2013/0217970 A1 * | 8/2013 | Weisenburgh | A61B 1/126 600/157 |

\* cited by examiner

*Primary Examiner* — Christian A Sevilla
(74) *Attorney, Agent, or Firm* — Lexigent LLC

(57) ABSTRACT

A modular surgical device is disclosed for efficient tissue dissection and fluid evacuation during surgical procedures. The device comprises a first portion with a cutting end tapered to a sharpened tip, a fluidic channel, and a uniquely shaped aperture. The aperture features an elliptical cross-section oriented at an angle relative to the device's longitudinal axis, potentially enhancing fluid flow dynamics. A releasable locking assembly securely connects the first portion to a second handle portion containing a fluidic channel and an angled external port for evacuation hose attachment. The device's modularity allows for customization and its angled port configuration is designed to minimize interference during surgical procedures.

18 Claims, 11 Drawing Sheets

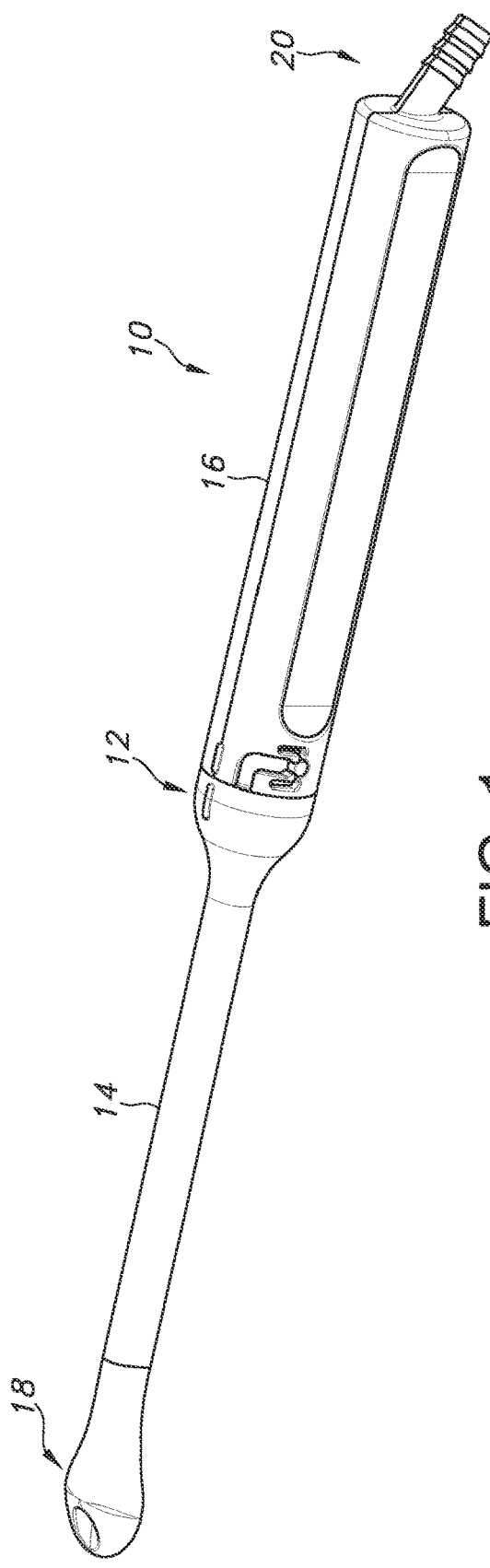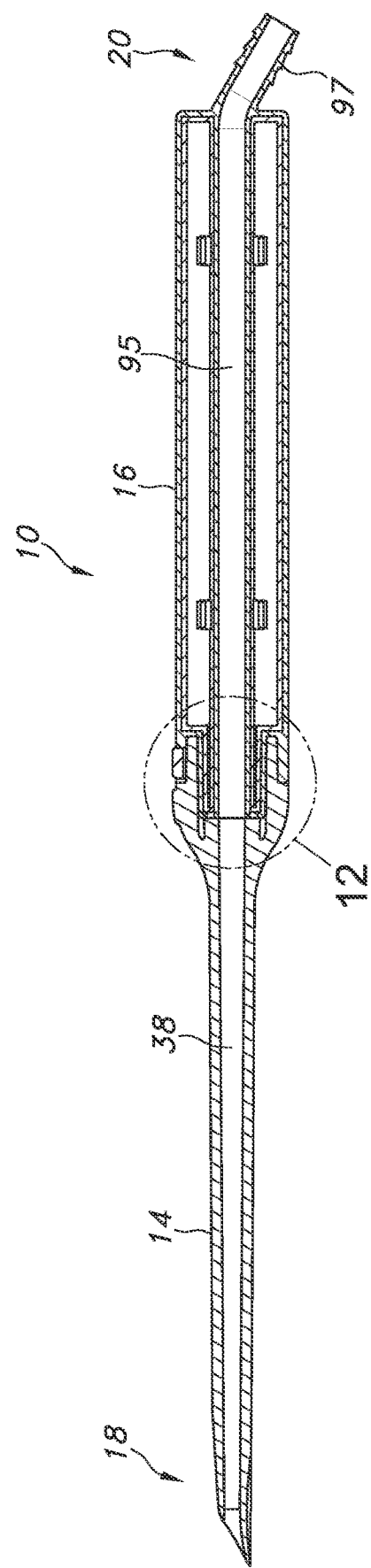
FIG. 1
FIG. 2

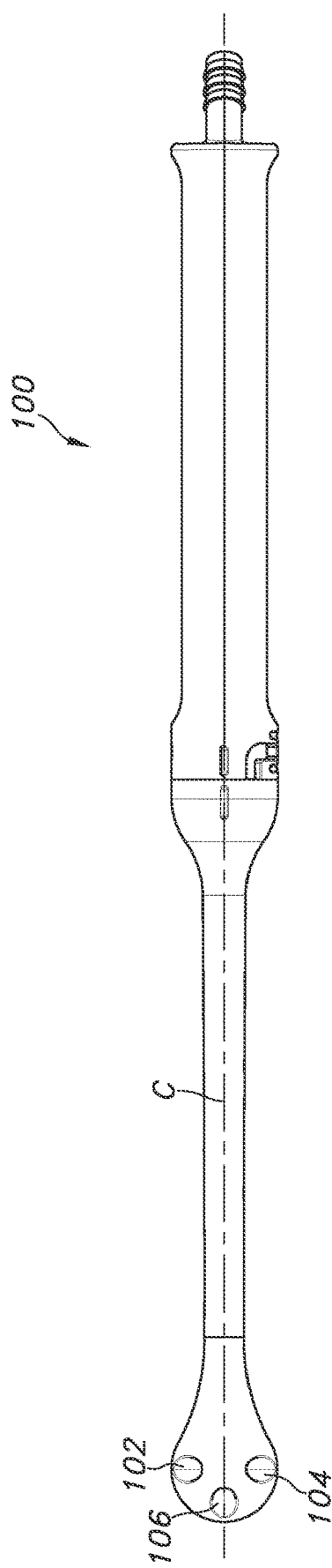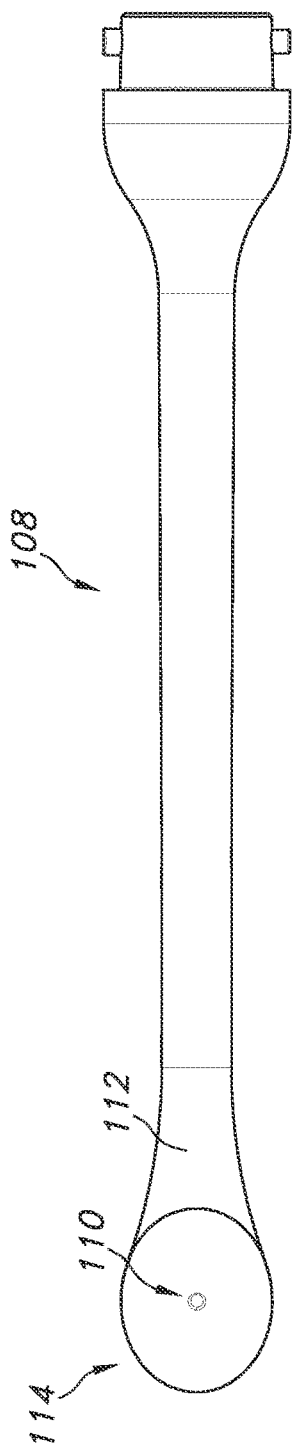
FIG. 17
FIG. 18

TOOL FOR TISSUE DISSECTION, FLUID SUCTION, AND SMOKE EVACUATION

CROSS-REFERENCE TO RELATED APPLICATIONS

This application claims the benefit and priority of U.S. Provisional Application Ser. No. 63/450,501, filed on Mar. 7, 2023, which is hereby incorporated herein by reference, including all references and appendices cited therein, for all purposes, as if fully set forth herein.

FIELD OF TECHNOLOGY

The present disclosure pertains to the field of medical devices, specifically surgical instruments. Some embodiments pertain to a modular surgical tool designed for the precise dissection of soft and hard tissues, the simultaneous suction of fluids during procedures, and the integrated evacuation of surgical smoke. This device aims to improve surgical efficiency, reduce instrument clutter, and enhance visualization in both open and minimally invasive surgical procedures.

SUMMARY

According to some embodiments, the present disclosure is directed to apparatuses or devices. One general aspect includes a device configured for tissue dissection and fluid evacuation during surgical procedures. The device also includes a body that is modular, may include a first portion and a second portion, the first portion having a first fluidic channel; a cutting end for dissection, the cutting end of the first portion being tapered to a sharpened tip; an aperture for evacuation of a fluid on the cutting end, where the aperture is characterized by an elliptical cross-sectional opening oriented at an angle relative to the longitudinal axis of the device; and the second portion being a handle and having a second fluidic channel that is in fluidic communication with the first fluidic channel. The device also includes a releasable locking assembly for securely connecting and disconnecting the first and second portions. The device also includes an external port extending from the second portion for attachment of an evacuation hose, where the external port is positioned at a predefined angle relative to a central axis of the device to minimize interference with the surgical procedures. Other embodiments of this aspect include corresponding computer systems, apparatus, and computer programs recorded on one or more computer storage devices, each configured to perform the actions of the methods.

Implementations may include one or more of the following features. The device where the cutting end is spoon-shaped. The spoon-shaped cutting end partially defines a concave bottom surface. The elliptical cross-sectional opening has a major axis and a minor axis, the major axis being longer than the minor axis, sloping from the cutting edge to the concave bottom surface. The device may include a bayonet-style locking assembly, a portion of which is associated with the first portion and another portion that is associated with the second portion. The bayonet-style locking assembly is configured to releasably lock and unlock the first portion and second portion by rotating the first portion relative to the second portion, the bayonet-style locking assembly has a pair of protrusions which are different sizes relative to one another for ensuring proper alignment of the first portion relative to the second portion. The bayonet-style locking assembly may include: a first collar of the first portion; a second collar of the second portion; a female annular interface of the first portion; and a male annular interface of the second portion. The device may include a first groove in the first collar of the first portion and a second groove in the second collar of the first portion, and a gasket that fits in the first groove and the second groove when the first and second portions are joined to create a fluid impermeable connection between the first fluidic channel of the first portion and the second fluidic channel of the second portion. The device may include: a receiving channel formed into a terminal end of a handle assembly of the second portion, the receiving channel terminating into a semi-circular notch; and a pair of arms that are resiliently biased to move between a rest position and a deflected position, the pair of arms configured to deflect into cavities disposed laterally to the pair of arms. The arms include protuberances and are configured to engage with the pair of protrusions of the first collar to form a releasable lock. The external port may include a swivel connection to the handle body allowing the evacuation hose to swivel as the device is moved. The device may include one or more additional apertures disposed laterally or adjacently to the aperture. A body of the first portion is angled in such a way that the cutting tip is positioned orthogonally to the first collar. The locking assembly may include a first collar with protrusions on the first portion and a second collar with receiving channels on the second portion, the protrusions and channels are designed to align and lock via a twist motion, with the protrusions being differently sized to ensure correct directional assembly and prevent misalignment.

The surgical device also includes an elongated body with a spoon-shaped cutting tip at a distal end, the cutting tip having a sharpened peripheral edge and defining a concave surface with an elliptical outer contour. The device also includes a fluid evacuation channel extending through the body and terminating in an aperture at the cutting tip, the aperture having an elliptical cross-section with a major axis longer than a minor axis, the major axis oriented towards the concave surface. The device also includes a bayonet-style locking assembly may include. The device also includes a first collar on the elongated body having two differently sized protrusions. The device also includes a second collar on the elongated body, spaced apart from the first collar, and having two receiving channels with arcuate shapes configured to align with the protrusions, the second collar may include a pair of resilient arms, each arm having a semi-circular notch and a grip configured to deflect into corresponding cavities within the second collar, engaging with the protrusions upon rotation to form a releasable lock. The device also includes a handle portion integrated into the second collar, the handle portion including a suction port extending at a predefined angle relative to a central axis of the handle, the suction port having a swivel connection.

Implementations may include one or more of the following features. The surgical device may include a gasket positioned between the first collar and the second collar, providing a fluid-tight seal between the fluid evacuation channel and a fluid channel within the handle portion. The surgical device may include one or more additional apertures disposed laterally or adjacently to the aperture. A body of the first portion is angled in such a way that the cutting tip is positioned orthogonally to the first collar. The locking assembly may include a first collar with protrusions on the first portion and a second collar with receiving channels on the second portion, the protrusions and channels are designed to align and lock via a twist motion, with the protrusions being differently sized to ensure correct directional assembly and prevent misalignment.

BRIEF DESCRIPTION OF THE DRAWINGS

Exemplary embodiments are illustrated by way of example and not limited by the figures of the accompanying drawings, in which references indicate similar elements.

FIG. 1 is a perspective view of an example device of the present disclosure.

FIG. 2 is a cross-sectional view of the device of FIG. 1.

FIG. 17 illustrates an alternative device with a plurality of apertures.

FIG. 18 illustrates an alternative device with an additional aperture positioned on a bottom surface orthogonal to the main aperture on the end of the device.

DETAILED DESCRIPTION

Overview

Figure 3:
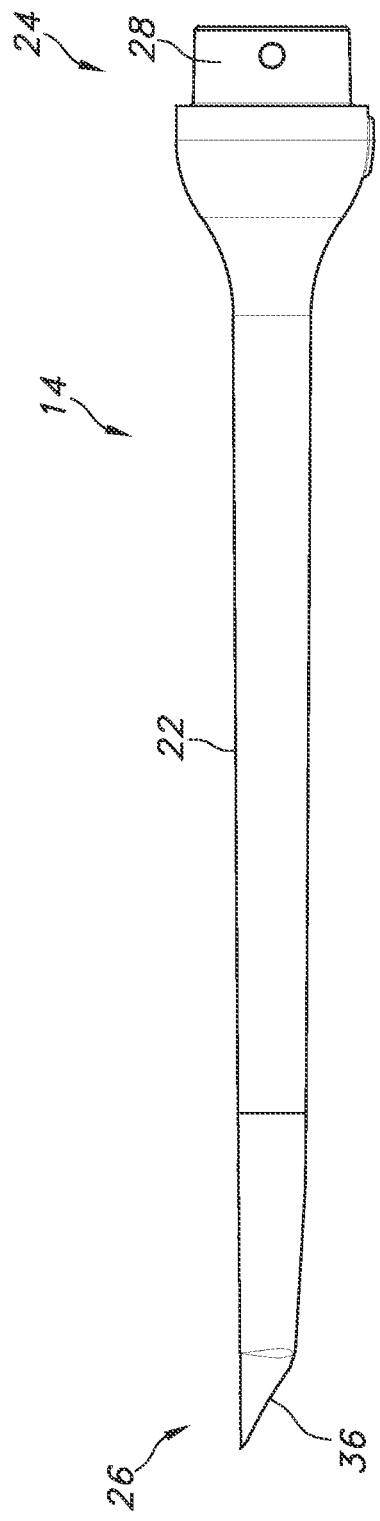
FIG. 3 is a side view of an example first portion of a device of the present disclosure.

A Cobb elevator is an orthopedic instrument commonly used by surgeons to lift and dissect tissues. The purpose of this tool is to expose the underlying bone structures during surgical procedures. It features a cutting edge for opening incisions and comes in various blade sizes to accommodate different patient sizes, from children to adults. Cobb elevators are part of a range of instruments used in neurosurgery and orthopedic surgery (can be used by any specialty), such as chisels, curets, osteotomes, and retractors. The Cobb elevator, in particular, is often utilized in spinal surgeries, for example, to expose the lamina of the spine for procedures like laminectomy. Its long handle and the shape of the blade allow for safe usage in deep spaces within the body.

The surgical devices disclosed herein address the long-standing challenges associated with tissue dissection, fluid suction, and smoke evacuation. These devices incorporate a modular design that enables the surgical tool to be customized according to the specific needs of a procedure, thereby reducing the number of instruments required and minimizing clutter. This modular nature not only facilitates ease of use but also ensures that the device can be adapted for a wide range of surgical applications, making it a versatile tool in both traditional and minimally invasive surgeries.

A feature of this device is its swivel connection, especially at the external port where an evacuation hose is attached. This design consideration significantly enhances the usability of the device, allowing for greater maneuverability and flexibility during surgery. The swivel connection ensures that the hose can move freely without interfering with the surgical process, thereby maintaining an unobstructed field of operation for the surgeon. This feature is particularly beneficial in complex procedures where space and visibility are limited, as it helps to maintain the sterility and integrity of the surgical field while facilitating the efficient evacuation of fluids and smoke.

Another feature of the device is the shape of its orifice or aperture, specifically designed to optimize fluid evacuation. The elliptical cross-sectional opening, oriented at an angle relative to the device's longitudinal axis, is a departure from traditional circular apertures. This unique design enhances the flow dynamics of evacuated fluids, potentially reducing clogging and ensuring a smoother, more efficient removal of fluids and smoke from the surgical site. The angled orientation of the aperture, combined with its elliptical shape, maximizes the evacuation capacity of the device, addressing a common problem in surgeries where the accumulation of fluids and smoke can obscure the surgical field and hinder the procedure.

The surgical devices present a comprehensive solution to several problems faced in surgical environments. The modular design, swivel connection for the evacuation hose, and the strategically shaped and oriented aperture collectively enhance surgical efficiency, maintain operational clarity, and improve the overall safety and effectiveness of surgical procedures.

Example Embodiments

Referring now to FIGS. 1 and 2 collectively, the device 10 includes a body 12 having two parts, first portion 14 and second portion 16 that can be joined together in releasable securement. In general, the first portion 14 is a dissection and evacuation tool and the second portion 16 is a handle with a central aperture that completes an evacuation path from one terminal end 18 of the device to a second terminal end 20. The first portion 14 and second portion 16 can be joined through a locking assembly, a segment of which is on the first portion 14 and another segment thereof is on the second portion 16.

In more detail, FIGS. 3-9 collectively illustrate an example embodiment of the first portion 14. In general, in FIGS. 3 and 4 the first portion 14 has a tool body 22 that is an elongated member that tapers from a connection point 24 for attachment to the second portion 16 and a tip 26 that is used to dissect tissue and evacuate fluids, as will be discussed infra. The connection point 24 includes a first collar 28 that is of reduced size relative to the remainder of the connection point. Two protrusions 30 and 32 are present on the first collar 28 and serve as part of the locking assembly, as mentioned above.

In some instances, the protrusions can be differently sized relative to one another. This ensures that the first portion 14 can only be installed onto the second portion 16 in a determined manner to prevent inadvertent misjoinder of the first portion 14 and the second portion 16, as will be discussed in greater detail herein. That is, the protrusions act as guides for proper alignment with the second portion 16.

The corresponding receiver slots for these differently-sized protrusions will be keyed or sized to match their respective sizes.

Figure 4:
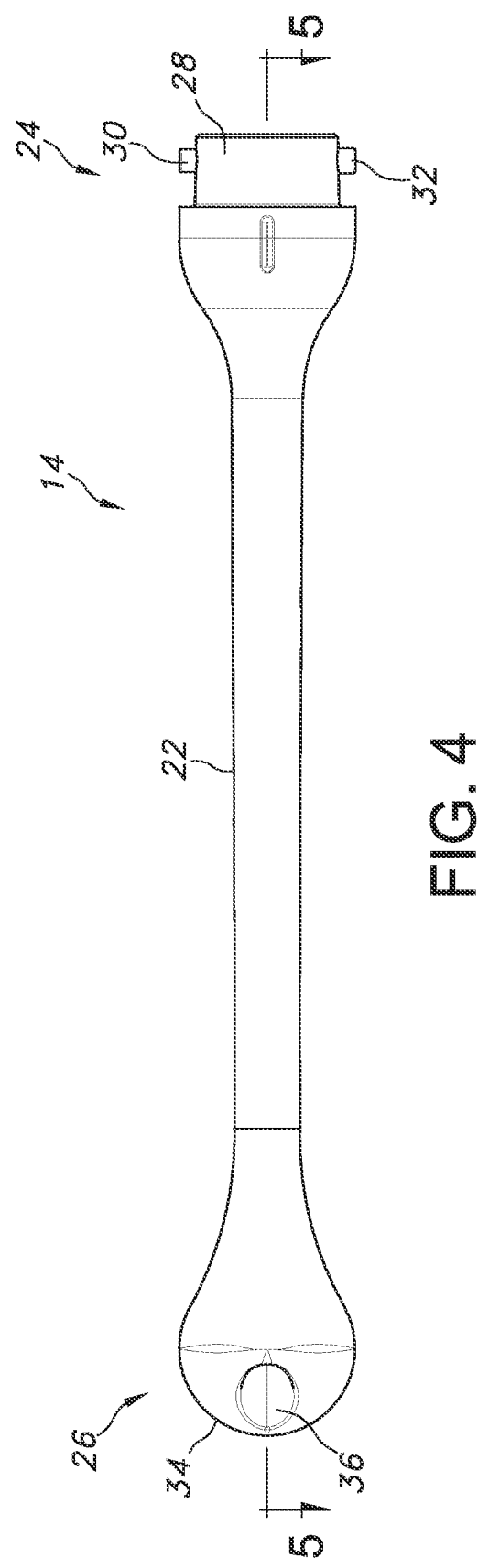
FIG. 4 is a top view of an example first portion of a device of the present disclosure.
Figure 5:
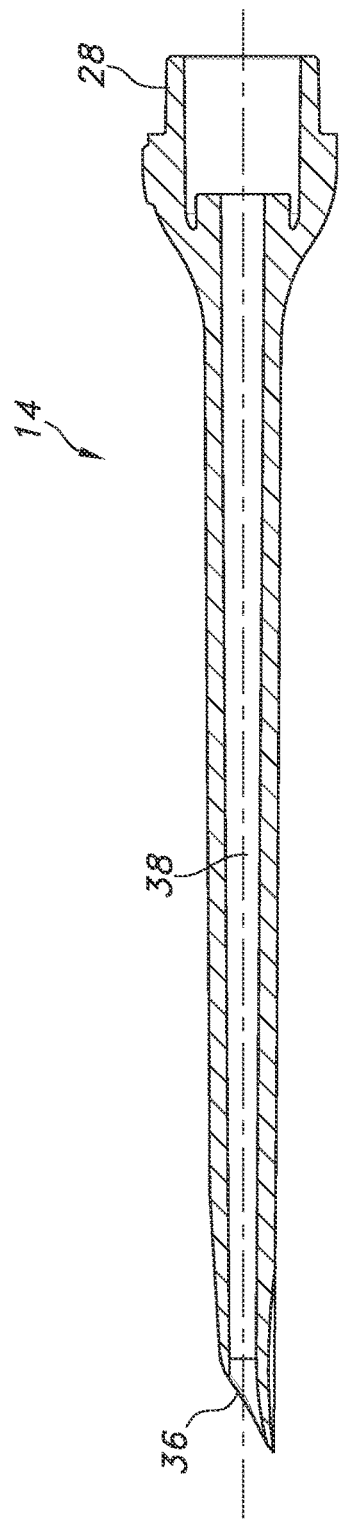
FIG. 5 is a cross-sectional view of the example first portion.
Figure 6:
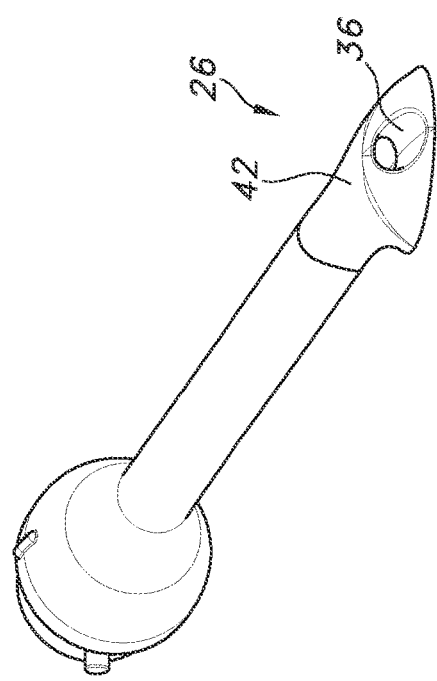
FIG. 6 is a perspective view of the front of the first portion illustrating an elliptical aperture.
Figure 7:
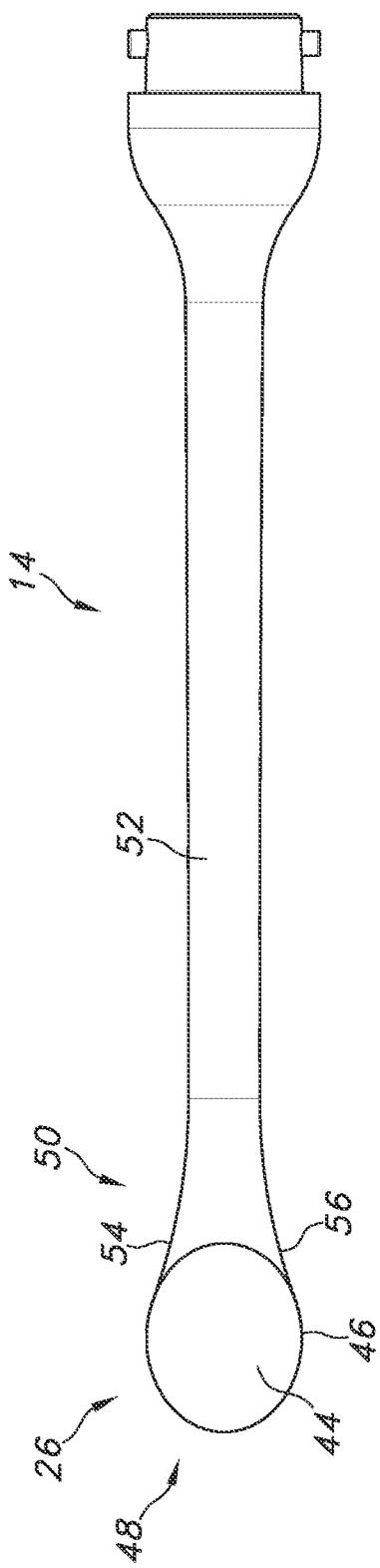
FIG. 7 is a bottom view of an example first portion of a device of the present disclosure.

The tip 26 is configured with a rounded terminal edge 34 as best shown in FIGS. 4 and 7. In some instances, this rounded terminal edge 34 can have a sharpened edge that is configured to dissect, cut, scrape, or otherwise separate tissue from tissue or bone. Stated otherwise, the tip 26 of the device is slender and elongated, with a conical shape that tapers to a sharp point. This conical section has an aperture 36 and a hollow central aperture in fluidic communication with a first fluidic channel 38 that runs through a length of the tip. The outer surface of the tip is smooth and continuous, to minimize friction or resistance when penetrating tissue.

The aperture 36 has a cross-sectional opening that is oriented at an oblique angle relative to its axis (see FIG. 6) and is designed to follow the contours of a curved surface 42. This angling results in the cross-section adopting an elliptical shape, diverging from the conventional circular profile typically seen in apertures situated on flat or linear surfaces. That is, the elliptical cross-sectional opening has a major axis and a minor axis, the major axis being longer than the minor axis, sloping from the cutting edge to the bottom surface of the tip.

The elliptical cross-section, by virtue of its elongated shape, encompasses a greater area compared to a circular cross-section of the same diameter. This increased area is significant as it allows for a more substantial volume of fluids to pass through the aperture 36. The design takes into account the fluid dynamics, optimizing for a more efficient flow that could potentially reduce clogging and allow for smoother transit of fluids. This is particularly beneficial where rapid and voluminous movement of liquids or gases is necessary, ensuring that the aperture can handle the required throughput without constriction. Moreover, the biasing of the opening towards the curved surface 42 further enhances this effect.

FIG. 7 is a perspective view of the tip 26 that shows a concavity of a bottom surface 44 of the tip 26. The tip of the device as shown exhibits a streamlined and tapered contour. In some instances, the tip is spoon-shaped and the bottom surface 44 has a concave profile that is defined by a substantially elliptical outer-peripheral edge 46. The remainder of the bottom surface 44 is substantially or entirely flat, in some embodiments.

An external contour of the tip 26 is configured to resemble a spoon, with a wide, rounded terminus designated as end 48, which narrows progressively into neck 50, leading into the main body of the tip 26, labeled as 52. The lateral surfaces, identified as sides 54 and 56, are crafted to facilitate a seamless transition from the rounded end 48 to the neck 50.

Figure 9:
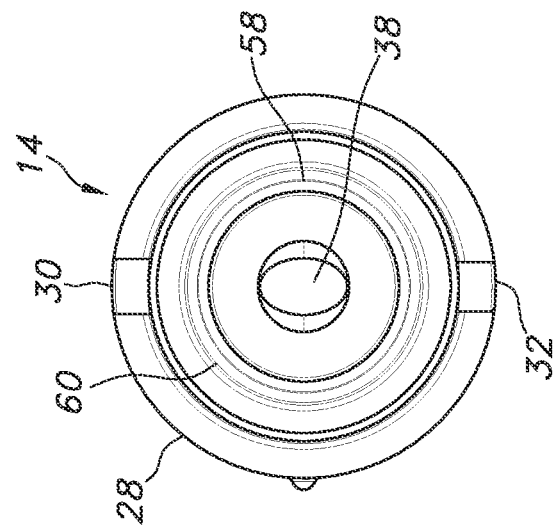
FIGS. 8 and 9 are respective front and end views of the example first portion.
Figure 8:
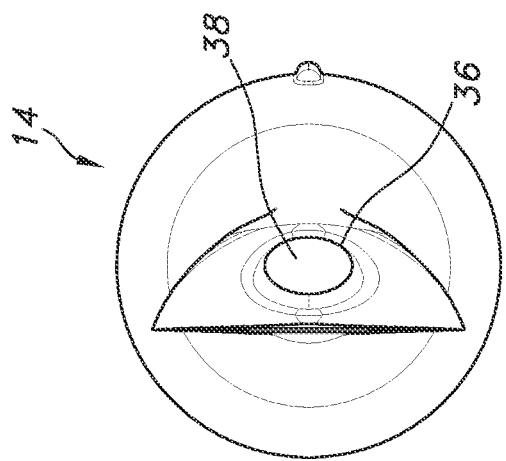

FIG. 9 is an end, perspective view of the first portion 14 that illustrates a female annular interface 58 having a groove 60. The inside diameter of the terminal end is defined by the first fluidic channel 38 that extends through the tip 26, and more specifically an inner sidewall of the first fluidic channel 38. In some instances, the first fluidic channel 38 provides a continuous diameter fluidic path from the opening of the aperture to the end of the female annular interface 58. The collar 28 and protrusions 30 and 32 are also shown. In other embodiments, the aperture 36 can be larger in diameter relative to the diameter of the first fluidic channel 38. That is, the aperture 36 can act as a funnel that tapers down to the diameter of the first fluidic channel 38.

Figure 10:
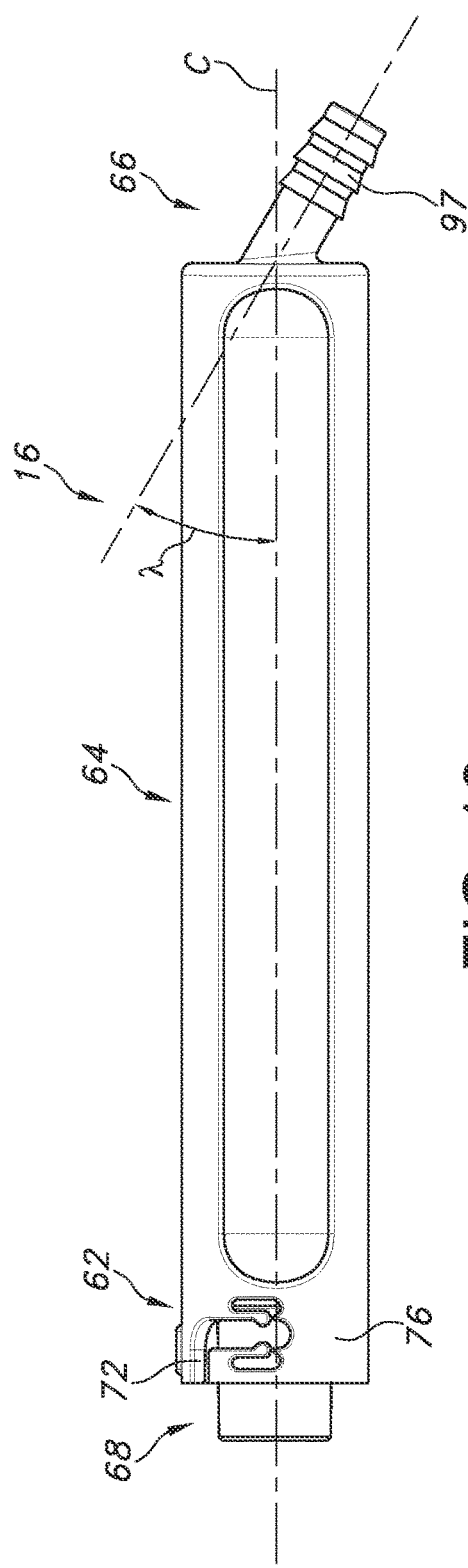
FIG. 10 is a side view of an example second portion of the device.
Figure 11:
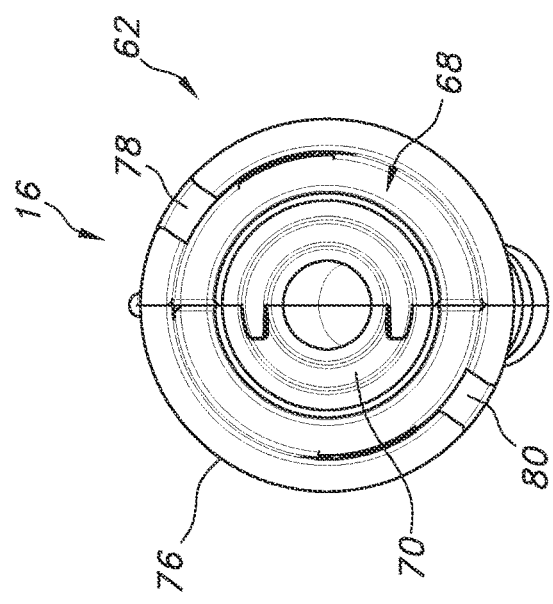
FIG. 11 is an end view of the example second portion of the device.
Figure 12:
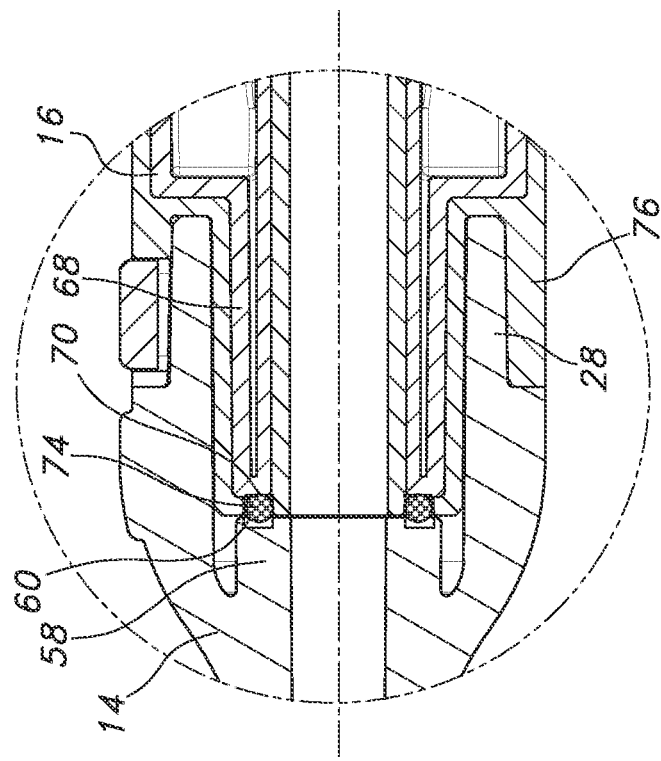
FIG. 12 is a partial cross-sectional view of the interconnection between the first and second portions.

Referring now to FIGS. 10-12 collectively, the second portion 16 is configured to include an interface end 62, a handle body 64, and a port end 66. In more detail, FIG. 11 is an end view of the second portion 16 illustrating the interface end 62 that includes a male annular interface 68 that is configured to mate with the female annular interface 58 of the first portion 14 (see FIG. 15). The male annular interface 68 is a substantially circular element having a groove 70. The male annular interface 68 extends past a terminal end 72 of the handle body 64.

When the first portion 14 and second portion 16 are joined, a gasket (such as an O-ring) 74 can be inserted and positioned inside the groove 60 of the female annular interface 58 and the groove 70 of the male annular interface 68. The gasket ensures a fluid-tight fit (fluid impermeable connection) between the first fluidic channel of the first portion 14 and a second fluidic channel of the second portion 16, as will be discussed in greater detail below.

Referring back to FIGS. 10 and 11, the terminal end 72 of the handle body 64 includes a second collar 76 that is spaced apart from the male annular interface 68. The spacing between the second collar 76 and the male annular interface 68 creates a space to receive the first collar 28 of the first portion 14, when the first portion 14 and the second portion 16 are coupled (again see FIG. 12). That is, when the first portion 14 and the second portion are joined together, the first collar 28 is inserted into the space between the second collar 76 and the male annular interface 68. The male annular interface 68 of the second portion 16 is inserted inside the first collar 28 of the first portion 14. Thus, the thickness of the first collar 28 is sized so as to nest into the space between the second collar 76 and the male annular interface 68.

As noted above, the device 10 includes a locking assembly. The locking assembly includes male interface features on the first portion 14, namely the first collar 28 with protrusions 30 and 32, as well as female interface features located on the handle body 64, namely the male annular interface 68 and the second collar 76.

In more detail, the second collar 76 includes two channels 78 and 80 (see FIG. 11) that are configured to receive the protrusions 30 and 32 of the first collar 28. A user can join the first portion 14 and the second portion 16 by aligning the protrusions 30 and 32 with their respective channels 78 and 80. In some instances, channels 78 and 80 each have an arcuate shape, which guides the protrusions 30 and 32 as the user twists the first portion 14 and the second portion 16 relative to one another to lock (or unlock) the device.

Figure 13:
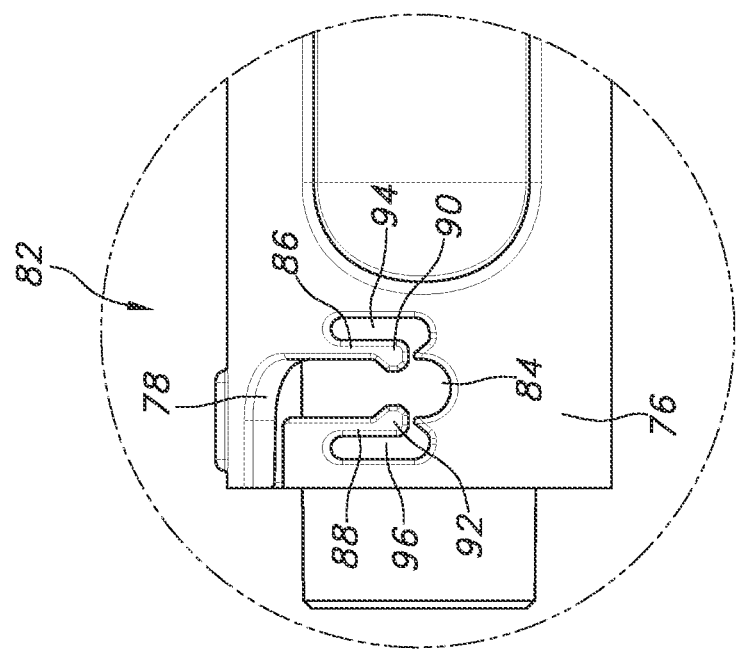
FIG. 13 is a close-up view of the end of the second portion of the device.
Figure 15:
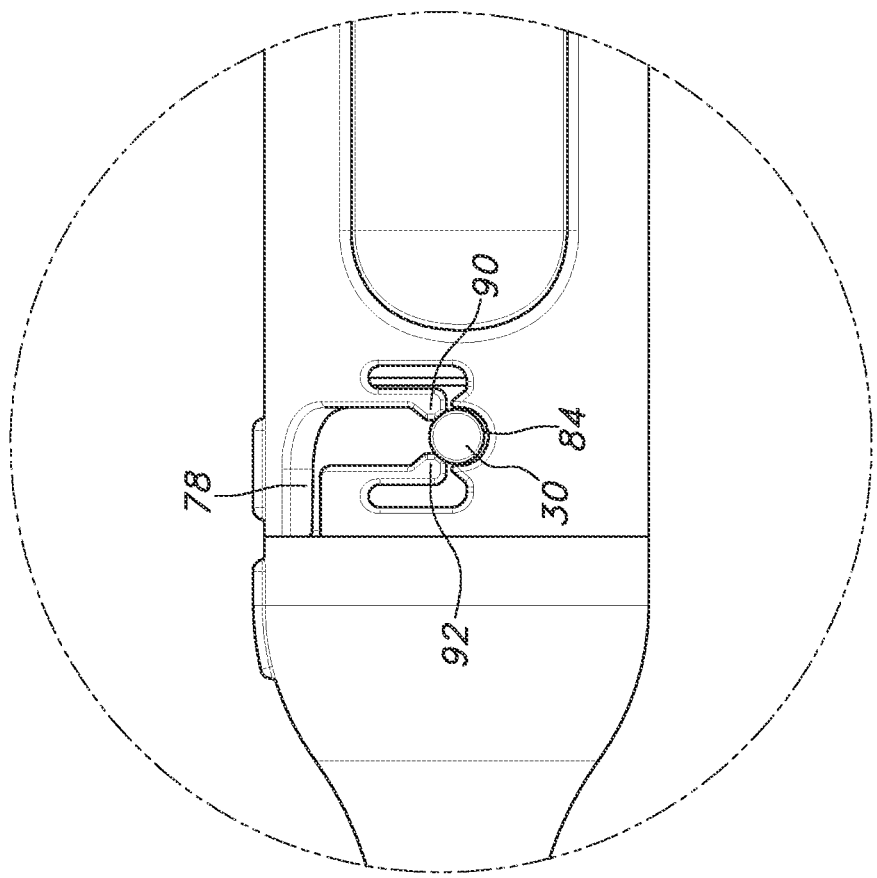
FIGS. 14 and 15 collectively illustrate the locking of the first and second portions.
Figure 14:
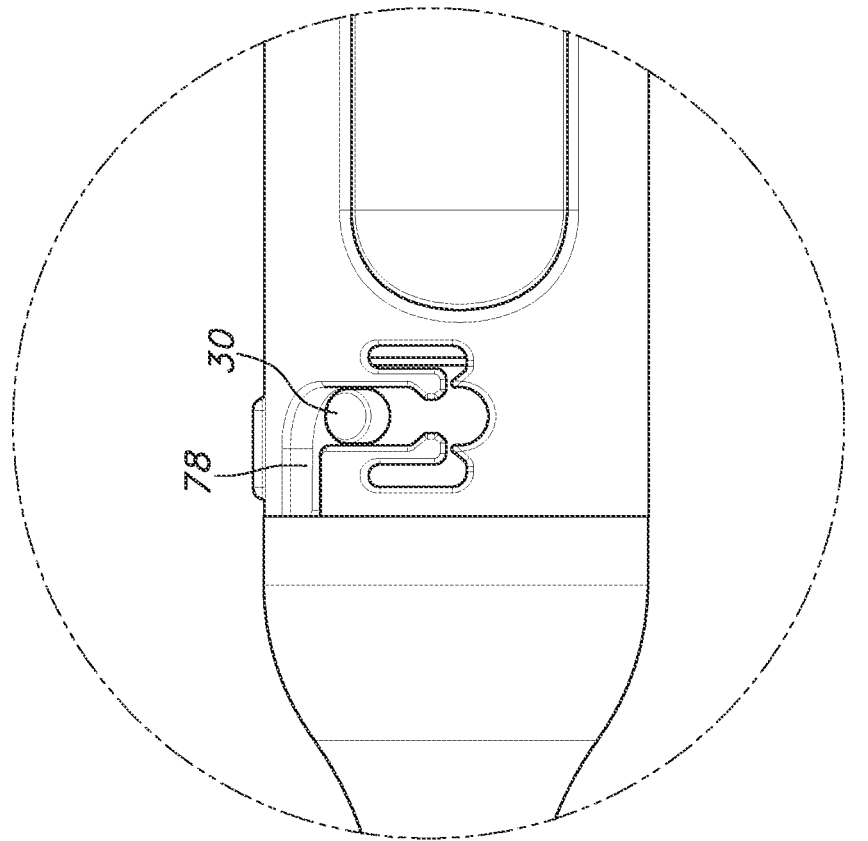

In some embodiments, and as best illustrated in FIGS. 13-15, to ensure a releasable locking configuration between the first portion 14 and the second portion 16, the second collar 76 includes two locking receivers, such as locking receiver 82. In general, the locking receiver 82 associated with channel 78 includes a semi-circular notch 84 that is configured to receive a part of the protrusion 30 when the protrusion 30 is fully seated and locked into the locking receiver 82. To further facilitate locking, the locking receiver 82 includes two resilient arms 86 and 88, each of which includes a protuberance, such as protuberances 90 and 92. As the protrusion 30 passes through the channel 78, the protrusion 30 encounters the protuberances 90 and 92 of the resilient arms 86 and 88. As the user turns the first portion 14 and the second portion 16, the protrusion 30 opens the resilient arms 86 and 88. The resilient arms 86 and 88 are permitted to open due to cavities 94 and 96 formed into the second collar 76. That is, as the protrusion 30 passes through the resilient arms 86 and 88, the resilient arms 86 and 88 are allowed to deflect into the respective cavities 94 and 96. These cavities 94 and 96 provide clearance for the resilient arms 86 and 88 to move from a resiliently biased starting position (when the protrusion 30 is not present), to a position that allows the protrusion 30 to pass between the resilient arms 86 and 88 and into the semi-circular notch 84. To be sure, each side of the second portion can have a locking receiver 82. In some instances, the device can include only one locking receiver 82.

Due to the resilient biasing of the arms 86 and 88, once the protrusion 30 passes into the semi-circular notch 84, the arms 86 and 88 return back to their initial biased position and the protuberances 90 and 92 aid in securing the protrusion 30 from an opposing direction relative to the semi-circular notch 84. This action releasably locks the first portion 14 to the second portion 16 until separated by a user. The device has been correctly locked when a first alignment aid 85 on the first collar 28 aligns with a second alignment aid 87 on the second collar 76. A locking process is illustrated collectively in FIGS. 14 and 15.

In order to unlock the first portion 14 and the second portion 16, the user can turn the first portion 14 and the second portion 16 in the opposite direction used to lock the device. This action causes the protrusion 30 to press against the protuberances 90 and 92, causing the arms 86 and 88 to deflect and open, allowing the protrusion 30 to pass between the arms 86 and 88.

The handle body 64 can be shaped to be easily and comfortably gripped by a user. Thus, the handle body 64 can include lateral indentations that allow the user to grip the device 10 in a secure manner with one hand. As noted above, the handle body includes a second fluidic channel 95 (see FIG. 2) that extends entirely through the handle body 64 from the male annular interface 68 to port end 66. When the first portion 14 and the second portion 16 are joined together, the first fluidic channel 38 of the first portion 14 and the second fluidic channel 95 of the second portion (handle body) align and provide a continuous fluidic path through the device 10.

Referring briefly back to FIG. 10, the port end 66 of the second portion has a hose interface 97 that is set at an angle A relative to a central axis C of the handle body 64. The intersection of the hose interface 97 with the handle body 64 is configured such that the hose interface 97 is in fluidic communication with the second fluidic channel 95. A suction pressure can be applied to the hose interface 97 through a hose 98 connected to a pump (not shown).

Figure 16:
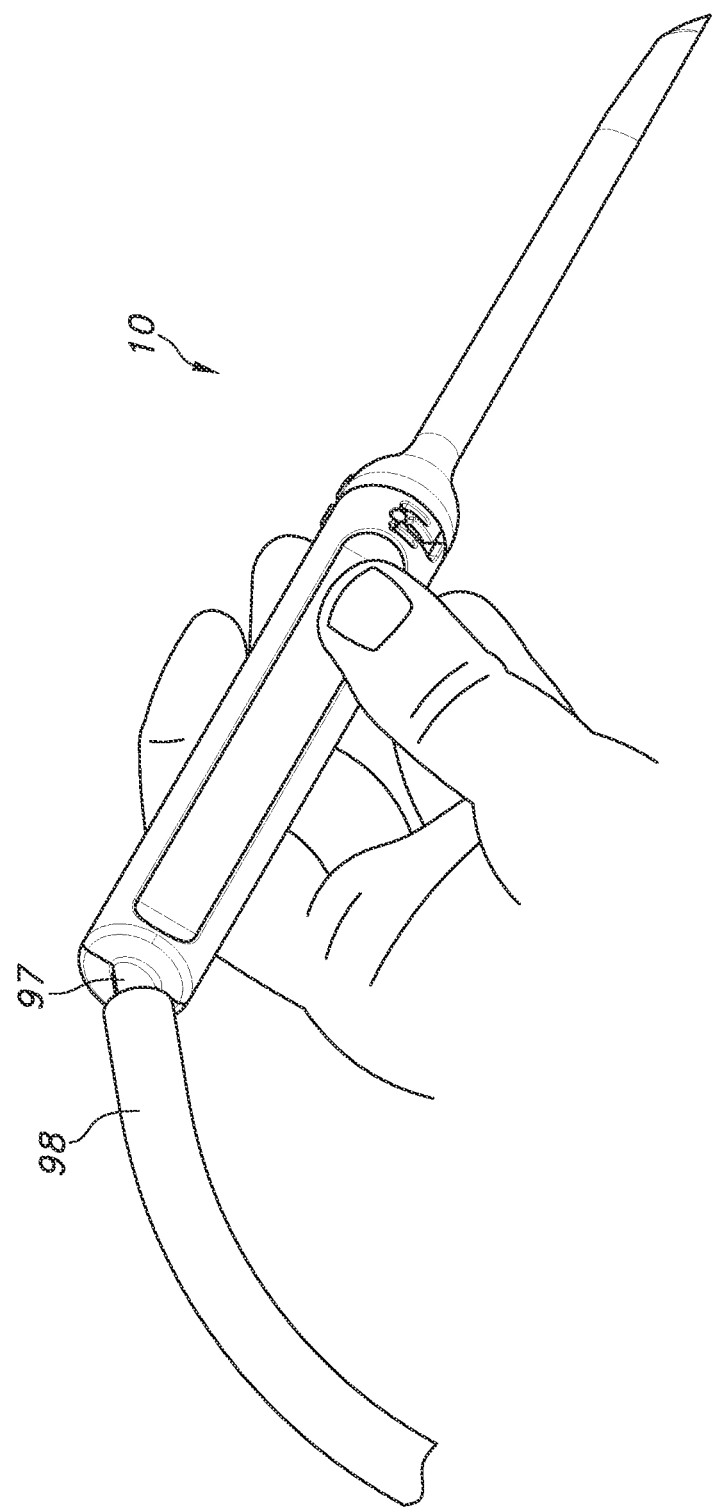
FIG. 16 illustrates the device in use.

When in use, (reference to FIG. 16) the device 10 is held by the surgeon in a tip-down manner. An orientation of the hose interface 97 set at the angle A reduces a likelihood that the hose 98 will interfere with or get into a line of sight of the surgeon which would likely occur if the hose interface 97 were axially aligned with the central axis C of the handle body 64.

In some instances, the hose interface 97 can include a swiveling connection to the handle body 64 so that the hose interface 97 can swivel about the handle body 64 and place the attached hose 98 in a preferential orientation as the device is moved and manipulated by the user.

FIG. 17 is an embodiment of another example device 100 that is similar to the device described above with the addition of one or more laterally or adjacently disposed apertures 102 and 104. These one or more laterally or adjacently disposed apertures 102 and 104 are positioned relative to an aperture 106 (such as the aperture 36 of Figures above) that is aligned with a central axis C of the device 100. In some instances, there is no central aperture, but only apertures disposed at angles relative to the central axis C of the device 100. To be sure, any aperture will serve as an opening to a path for the communication of fluids through the device 100. While two additional apertures have been illustrated, one of ordinary skill in the art would appreciated that only one, or possibly more than two apertures can be included.

FIG. 18 is an embodiment of another example device 108 that is similar to the device described above with the addition of one or more orthogonally or angularly disposed apertures, such as aperture 110. In this instance, the aperture is located on a bottom surface 112 of a tip 114 of the device 108.

Figure 19:
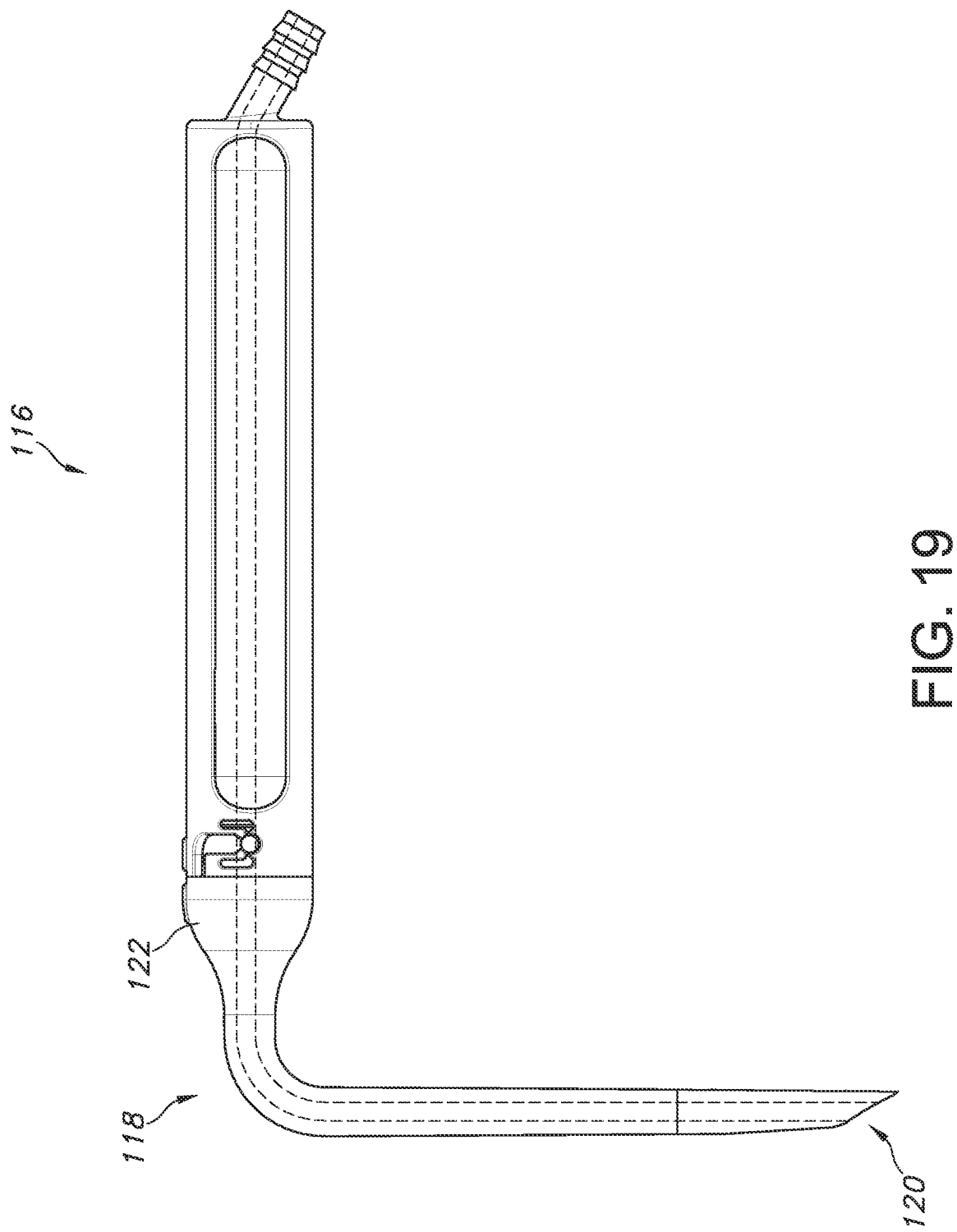
FIG. 19 illustrates yet another example device that includes an angled first portion.

FIG. 19 is an embodiment of another example device 116 that includes a first portion 118 that is angled. In this instance, the tip 120 of the first portion 118 is angled orthogonally to a first collar 122 of the first portion 118. It will be understood that the first portion 118 includes a path for fluidic communication that runs centrally to the device 116 despite the angularity of the first portion 118. While an orthogonal angle is illustrated, the first portion 118 can have any angle or curve that would be advantageous.

Figure 20:
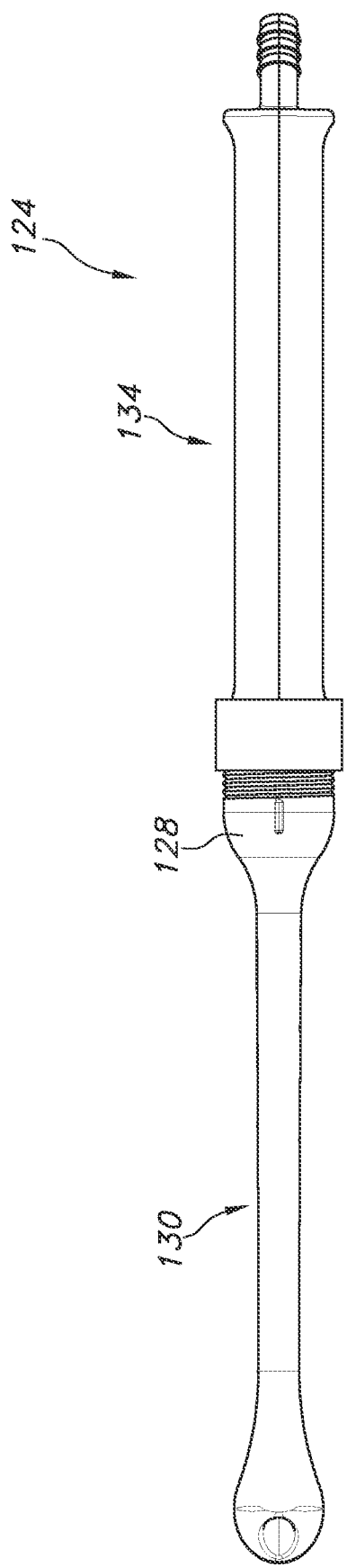
FIG. 20 illustrates another example device having an alternative locking mechanism.

FIG. 20 illustrates another example device 124 that includes an alternative locking assembly. In this example, a first collar 128 of a first portion 130 can be threaded. A sleeve 132 can be configured to slide over (but only partially) a terminal end of the second portion 134. An inside of the sleeve 132 is threaded to engage with the threads on the first collar 128 of the first portion 130 to releasably secure the first portion 130 and the second portion 134. The sleeve 132 can include elements configured to assist the user in gripping such as beveled edges or knurls.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

The terminology used herein can imply direct or indirect, full or partial, temporary or permanent, immediate or delayed, synchronous or asynchronous, action or inaction. For example, when an element is referred to as being "on," "connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present.

The terminology used herein is for the purpose of describing particular embodiments only and is not intended to be necessarily limiting of the disclosure. As used herein, the singular forms "a," "an" and "the" are intended to include the plural forms as well, unless the context clearly indicates otherwise. The terms "comprises," "includes" and/or "comprising," "including" when used in this specification, specify the presence of stated features, integers, steps, operations, elements, and/or components, but do not preclude the presence or addition of one or more other features, integers, steps, operations, elements, components, and/or groups thereof.

Example embodiments of the present disclosure are described herein with reference to illustrations of idealized embodiments and intermediate structures of the present disclosure. As such, variations from the shapes of the illustrations as a result, for example, of manufacturing techniques and/or tolerances, are to be expected. Thus, the example embodiments of the present disclosure should not be construed as necessarily limited to the particular shapes of regions illustrated herein, but are to include deviations in shapes that result, for example, from manufacturing.

In this description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" or other phrases having similar import at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term e.g., "on-demand" may be occasionally interchangeably used with its non-hyphenated version e.g., "on demand", a capitalized entry e.g., "Software" may be interchangeably used with its non-capitalized version e.g., "software", a plural term may be indicated with or without an apostrophe e.g., PE's or PEs, and an italicized term e.g., "N+1" may be interchangeably used with its non-italicized version e.g., "N+1". Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

What is claimed is:

1. A device configured for tissue dissection and fluid evacuation during surgical procedures, the device comprising:
   a body that is modular, comprising a first portion and a second portion, the first portion having a first fluidic channel;
   wherein the first portion comprises a cutting end for dissection, the cutting end of the first portion being tapered to a sharpened tip;
   an aperture for evacuation of a fluid on the cutting end, wherein the aperture is characterized by an elliptical cross-sectional opening oriented at an angle relative to a longitudinal axis of the device; and
   the second portion being a handle and having a second fluidic channel that is in fluidic communication with the first fluidic channel;
   a releasable locking assembly for securely connecting and disconnecting the first and second portions; and
   an external port extending from the second portion for attachment of an evacuation hose, where the external port is positioned at a predefined angle relative to a central axis of the device to minimize interference with the surgical procedures.

2. The device of claim 1, wherein the cutting end is spoon-shaped.

3. The device of claim 2 wherein the spoon-shaped cutting end partially defines a concave bottom surface.

4. The device of claim 3, wherein the elliptical cross-sectional opening has a major axis and a minor axis, the major axis being longer than the minor axis.

5. The device of claim 1, further comprising a bayonet-style locking assembly, a portion of which is associated with the first portion and another portion which is associated with the second portion.

6. The device of claim 5, wherein the bayonet-style locking assembly is configured to releasably lock and unlock the first portion and second portion by rotating the first portion relative to the second portion, the bayonet-style locking assembly having a pair of protrusions which are different sizes relative to one another for ensuring proper alignment of the first portion relative to the second portion.

7. The device of claim 6, wherein the bayonet-style locking assembly comprises:
   a first collar of the first portion;
   a second collar of the second portion;
   a female annular interface of the first portion; and
   a male annular interface of the second portion.

8. The device of claim 7, further comprising a first groove in the first collar of the first portion and a second groove in the second collar of the second portion, and a gasket that fits in the first groove and the second groove when the first and second portions are joined to create a fluid impermeable connection between the first fluidic channel of the first portion and the second fluidic channel of the second portion.

9. The device of claim 8, further comprising:
   a receiving channel formed into a terminal end of the second portion, the receiving channel terminating into a semi-circular notch; and
   a pair of arms that are resiliently biased to move between a rest position and a deflected position,
   cavities disposed laterally to the pair of arms, and
   wherein the pair of arms are configured to deflect into the cavities disposed laterally to the pair of arms.

10. The device according to claim 9, wherein the arms include protuberances, and the protuberances are configured to engage with the pair of protrusions of the first collar to form a releasable lock.

11. The device according to claim 1, further comprising one or more additional apertures disposed laterally or adjacently to the aperture.

12. The device according to claim 1, wherein the first portion comprises a body, a cutting tip, and a first collar, and the body of the first portion is angled in such a way that the cutting tip is positioned orthogonally to the first collar.

13. The device according to claim 1, wherein the locking assembly comprises a first collar with protrusions on the first portion and a second collar with receiving channels on the second portion, the protrusions and channels designed to align and lock via a twist motion, with the protrusions being differently sized to ensure correct directional assembly and prevent misalignment.

14. A surgical device comprising:
- an elongated body with a spoon-shaped cutting tip at a distal end, the cutting tip having a sharpened peripheral edge, the distal end defining a concave surface with an elliptical outer contour;
- a fluid evacuation channel extending through the body and terminating in an aperture at the cutting tip, the aperture having an elliptical cross-section with a major axis longer than a minor axis;
- a bayonet-style locking assembly comprising:
- a first collar on the elongated body having two differently sized protrusions;
- a second collar on the elongated body, spaced apart from the first collar, the second collar having two receiving channels with arcuate shapes configured to align with the protrusions, the second collar further comprising a pair of resilient arms; and
- a handle portion integrated into the second collar, the handle portion including a suction port extending at a predefined angle relative to a central axis of the handle.

15. The surgical device of claim 14, further comprising a gasket capable of being positioned between the first collar and the second collar, the gasket capable of providing a fluid-tight seal.

16. The surgical device of claim 15, further comprising one or more additional apertures disposed laterally or adjacently to the aperture.

17. The surgical device of claim 16, wherein the surgical device comprises a first portion comprising a body, a cutting tip, and the first collar, and the body of the first portion is angled in such a way that the cutting tip is positioned orthogonally to the first collar.

18. The surgical device of claim 17, wherein the surgical device comprises a second portion, and the first collar comprises protrusions on the first portion and the second collar comprises receiving channels on the second portion, the protrusions and channels designed to align and lock via a twist motion, with the protrusions being differently sized to ensure correct directional assembly and prevent misalignment.

* * * * *